Figure 1:
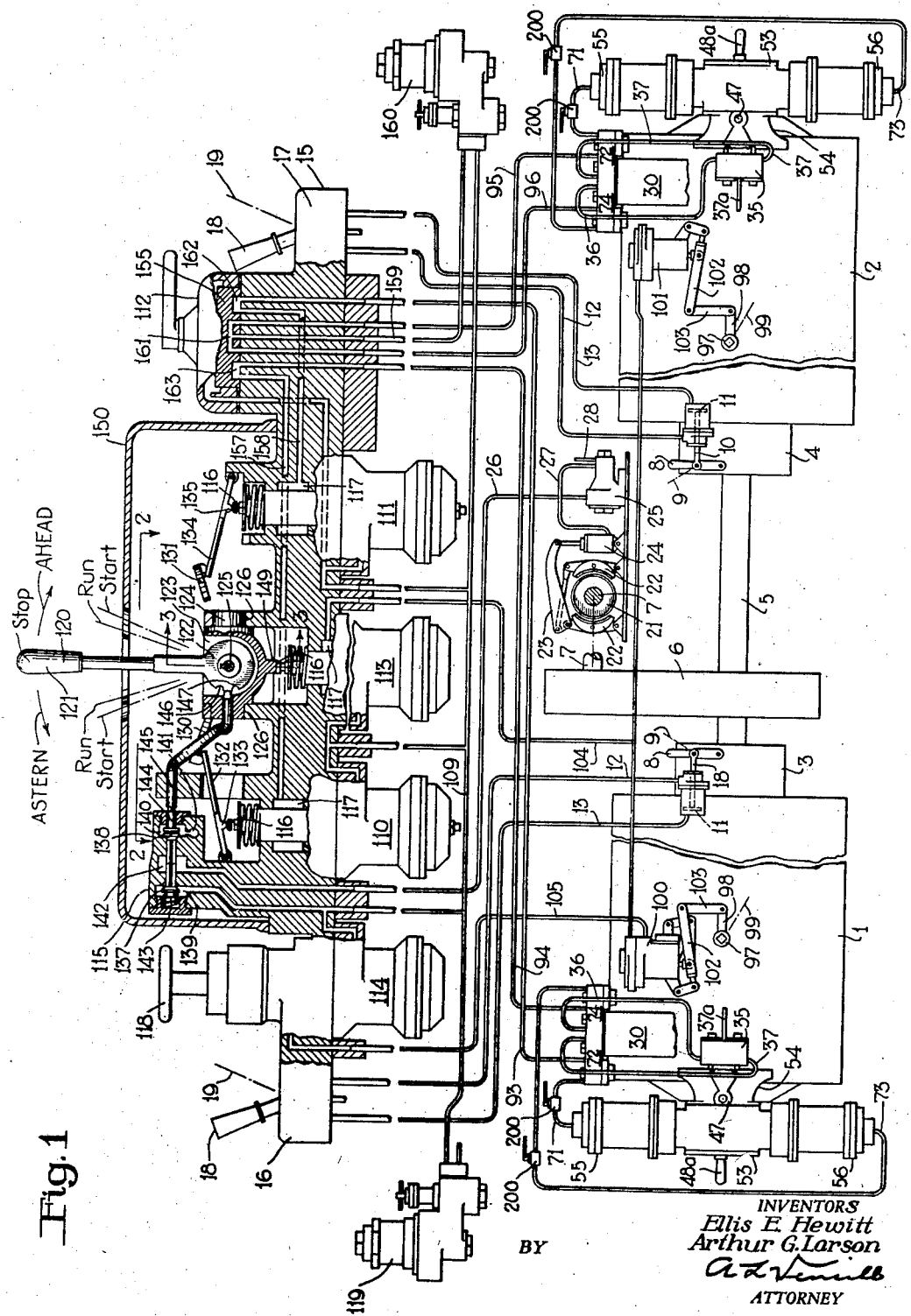

Nov. 23, 1948.  E. E. HEWITT ET AL  2,454,509
CONTROL APPARATUS
Filed Sept. 3, 1943  2 Sheets-Sheet 1

INVENTORS
Ellis E. Hewitt
Arthur G. Larson
BY
ATTORNEY

Nov. 23, 1948.  E. E. HEWITT ET AL  2,454,509
CONTROL APPARATUS
Filed Sept. 3, 1943  2 Sheets-Sheet 2
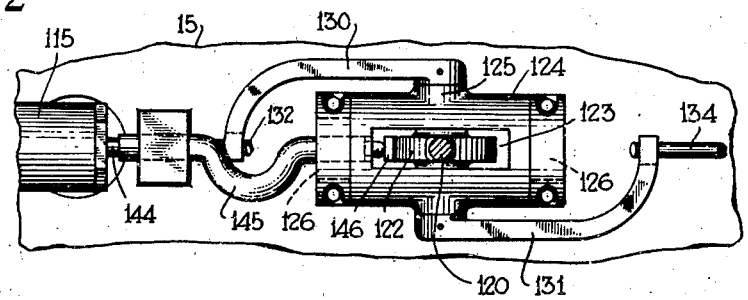
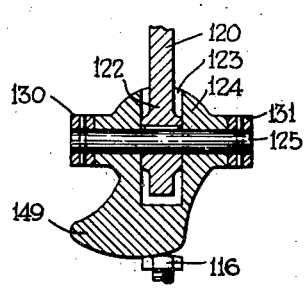
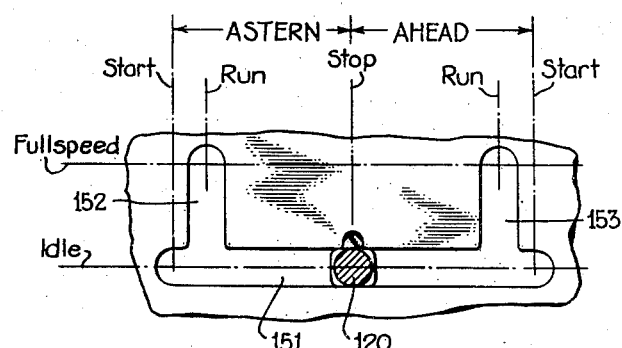
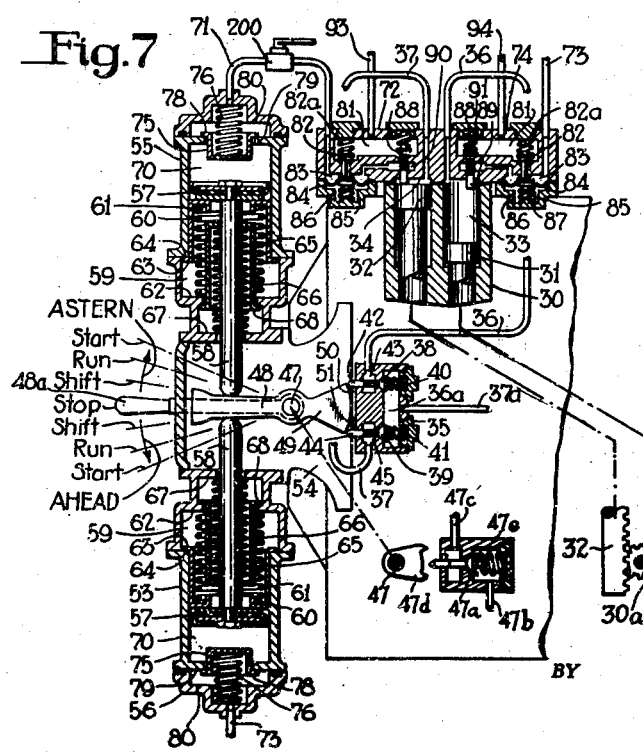
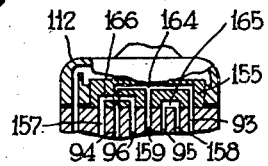
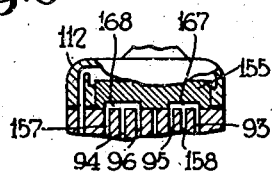
INVENTORS
Ellis E. Hewitt
Arthur G. Larson
ATTORNEY Patented Nov. 23, 1948

2,454,509

UNITED STATES PATENT OFFICE 2,454,509

CONTROL APPARATUS

Ellis E. Hewitt, Edgewood, and Arthur G. Larson, Forest Hills, Pa., assignors to The Westinghouse Air Brake Company, Wilmerding, Pa., a corporation of Pennsylvania Application September 3, 1943, Serial No. 501,062

9 Claims. (Cl. 60—97)

This invention relates to control apparatus and more particularly to a control system embodying a plurality of reversible propulsion engines.

In the copending application of Roy R. Stevens and Arthur G. Larson, Serial No. 494,612, filed July 14, 1943 there is disclosed a ship's control system embodying two reversible Diesel type engines and manually controlled pneumatic means for selectively controlling the starting, stopping, reversing and speed or power output of the engines, and for also controlling individual coupling means for connecting and disconnecting each engine to and from a ship's propeller and for further controlling braking means for braking the propeller shaft.

One object of the invention is the provision of a novel control system of the above general type.

The above described system embodies an individual lever for controlling the starting, stopping, and reversing of each engine and for also controlling the propeller shaft brake, and another lever for controlling the speed or power output of the engines either singly or in multiple.

Another object of the invention is the provision of a control system embodying a single manually operable lever for controlling all of these operations in connection with two engines, either individually or in multiple.

Still another object of the invention is the provision of a control system for a plurality of engines embodying a single manually operable lever for controlling the starting, stopping, and reversing of the engines, and also embodying selector means for selectively rendering either or both of said engine responsive to operation of said lever.

In certain Diesel engines the cam shaft for controlling the valve timing has certain cams to provide for operation of the engine in one direction and other cams for operation of the engine in the reverse direction, and it is necessary to shift or condition those cams in accordance with the direction in which it is desired to start and run the engine. Moreover, it is also desirable to cause the cams to be thus conditioned or shifted to the desired position before the starting means for the engine is operated.

In the copending application hereinbefore referred to, the manually operative starting, stopping, and reverse control means for each engine is provided with a lever having a neutral or stop position for stopping the engine and is movable therefrom in one direction, to first, a shift position to cause shifting of the engine cams to provide for operation of the engine in one direction. The lever is then movable further to a start position to start the engine in the selected direction, and after thus starting, the lever is pulled back to a run position in which it remains until such time as it is desired to either stop or reverse the engine. The lever is also movable from stop position in the reverse direction to reversely arranged shift, start and run positions for placing the engine in operation in the reverse direction. In order to insure that the cams will be shifted to the desired position before starting of the engine occurs, automatically operable blocking means are provided to prevent the operator moving the control lever past either shift position to the respective start position until after the cams are properly shifted. After the cams are thus properly conditioned the blocking means becomes ineffective and permits movement of the lever to the selected start position.

Another object of the invention is the provision of a novel arrangement for accomplishing the results just described without, however, interfering with movement of the manually operative lever from stop position to the selected start position. With this novel arrangement the operator may move the control lever from stop position directly and without any hesitation, to the selected start position, and automatic means is thereby set into operation to cause proper conditioning of the engine cams, and after, and only after, the cams are thus properly conditioned, the automatic means provides for operation of engine starting means in accordance with the selected start position of the control lever.

The improved system thus provides for selective starting, stopping, and reversing of either engine individually, or of both in unison, as determined by the condition of the selector valve. Since the direction of operation of the engines is determined by the position of the single control lever, the two engines cannot be started and run in opposite directions at the same time, which is desirable where the two engines are arranged to drive a common propeller. The selector valve provides for stopping of either engine while allowing the other to continue to operate, and also provides for starting of either engine and cutting it in to operate in unison with the other engine which may be operating. The single lever for controlling the starting, stopping and reversing of the engines also controls the brake on the propeller shaft in order to attain prompt stopping of the engine or engines any time when the lever is operated to reverse same. The brake is released only with the control lever in either run position.

Other objects and advantages will be apparent from the following more detailed description of the invention.

In the accompanying drawings; Fig. 1 is a diagrammatic view, partly in section and partly in outline, of a control system embodying the invention; Figs. 2 and 3 are sectional views taken on lines 2—2 and 3—3, respectively, in Fig. 1; Fig. 4 is a partial plan view of a manual controller shown in Fig. 1, a portion of the operating lever being shown in cross section; Figs. 5 and 6 are diagrammatic views of a selector valve device shown in Fig. 1 but with the valve thereof shown in different positions; and Fig. 7 is an enlarged sectional view of a portion of the control apparatus associated with each engine and shown in elevation in Fig. 1.

*Description*

Referring to Fig. 1, the novel control system, certain parts of which are generally similar to or substantially the same as parts of the system disclosed in the copending application above referred to, comprises a plurality of reversible engines 1 and 2 of the Diesel type connected by clutches preferably in the form of liquid couplings 3 and 4, respectively, to a common drive shaft 5 which is connected through a reduction gear 6 to a single ship's propeller shaft 7. By this arrangement the propeller of a ship may be driven in either direction by both engines 1 and 2 upon filling both couplings with liquid, or by either engine individually upon filling the respective fluid coupling with liquid and draining the liquid from the other fluid coupling, by any conventional filling and draining mechanism.

The filling and draining mechanism for each of the fluid couplings 3 and 4 may be controlled by a lever 8 having, what may be termed, a dump position for draining the coupling, and a fill position for filling the couplings. In the drawing the lever 8 of each coupling is shown in the dump position, while the fill position of the lever is indicated by a dot and dash line 9. Each lever 8 is connected by a rod 10 to a piston 11, the chambers at the opposite sides of the piston being open to pipes 12 and 13, respectively.

Fluid under pressure supplied through pipe 12 to one side of piston 11 when the opposite side is vented by way of pipe 13, will move the piston 11 and thereby the rod 8 to the dump position in which it is shown in the drawing, while release of fluid under pressure from pipe 12 and supply of fluid under pressure to pipe 13 will actuate the piston 11 to move the lever 8 to the fill position indicated by the dot and dash line 9 in Fig. 1.

The reference numeral 15 designates an operator's control stand which, on a ship, may be located in the pilot house, and associated with the stand are two independently operative coupling control devices 16 and 17, for controlling control pistons 11 for the fluid couplings 3 and 4, respectively. Each of the control devices 16 and 17 may be identical and of any suitable structure, comprising an operating lever 18 and valve means (not shown) conditionable by said lever for selectively controlling the supply and release of fluid under pressure to and from pipes 12 and 13 leading to opposite sides of the respective coupling control piston 11. The lever 18 of each control device may have a dump position in which it is shown in the drawing for releasing fluid under pressure from the respective pipe 13 and for supplying fluid under pressure to the respective pipe 12 and may be movable from this position to a fill position, indicated by a dot and dash line 19, for relieving the pressure of fluid from said pipe 12 and for supplying fluid under pressure to said pipe 13 for thereby selectively conditioning the respective coupling in the manner above described.

A brake is associated with the propeller shaft 7 for braking said shaft and thereby the propeller (not shown), and, through the medium of the reduction gear 6, the drive shaft 5 and engines 1 and 2. This brake may comprise a brake drum 21 mounted on shaft 7 for rotation therewith, friction brake shoes 22 for engaging said drum, means including a lever 23 for operating said shoes into and out of engagement with said drum, and a fluid pressure responsive brake cylinder device 24 for controlling said means. A supply of fluid under pressure to the brake cylinder device 24 will actuate the lever 23 to apply the brake shoes to the drum, while the shoes will be released from the drum upon release of fluid under pressure from said cylinder device.

A relay valve device 25, of any suitable structure, arranged for control by fluid under pressure through a pipe 26, is provided for controlling through a pipe 27 the operation of the brake cylinder device 24. Upon supply of fluid under pressure to pipe 26, the relay valve device 25 will operate to supply fluid under pressure from any suitable source, such as a pipe 28, to the brake cylinder device 24, while upon release of fluid under pressure from pipe 26, the relay valve device will operate to release fluid under pressure from the brake cylinder device 24.

Structures of the general type so far described are so well known that no further description thereof is deemed essential in the present application.

Each of the Diesel engines 1 and 2 may be of any conventional reversible type embodying cam shafts (not shown) which are shiftable to one position to provide for operation of the engine in one direction and to another position to provide for operation of the engine in the reverse direction. For shifting the cams, each engine may be provided with a fluid motor 30 embodying a ram 31 (Fig. 7) which is operable by fluid under pressure to actuate a gear 30a to condition the cam shaft to provide for operation of the engine in one direction, such as for instance to cause movement of the ship in an ahead direction. Each motor 30 may also embody a ram 32 operable by fluid under pressure to actuate the gear 30a to condition the cam shaft to provide for operation of the engine in the reverse direction, as for obtaining astern movement of the ship.

The ram 31 has at one side a pressure chamber 33 to receive actuating fluid and said ram is shown in Fig. 7 in the position to which it will be moved by such fluid for conditioning the cam shaft for ahead movement of the ship, under which condition the ram 32 will occupy the position shown. With ram 32 in a position corresponding to that of ram 31 as shown in Fig. 7, the cams of the engine will be conditioned to provide for astern movement of the ship. The ram 32 has at one side a pressure chamber 34 to receive fluid under pressure for moving it to the cam shfted position just mentioned. Movement of either ram by fluid under pressure to the position in which ram 31 is shown in the drawing, will cause movement of the other ram to its other position, i. e., to the position in which the ram 32 is shown. The means whereby upward movement of one ram is effected upon downward movement of the other ram by fluid under pressure is not shown in the drawings and is not pertinent to the invention.

A valve device 35 is associated with each of the engines for controlling the supply and release of fluid under pressure to and from the ram pressure chambers 33 and 34 by way of pipes 36 and 37, respectively. As shown in Fig. 7, the valve device 35 may comprise a casing having a chamber 36a arranged to be constantly supplied with fluid under pressure from any suitable source by way of a pipe 37a. The chamber 36a contains two poppet valves 38 and 39 which are normally urged to a seated or closed position by springs 40 and 41, respectively. The valve 38 has a stem 42 extending through a bore connecting chamber 36 to a chamber 43 and thence through chamber 43 and a wall thereof to the exterior of the casing. The valve 39 has a stem 44 extending through a similar chamber 45 to the exterior of the casing.

The two valve stems 42 and 44 are arranged in parallel spaced relation. The portions of valve stems 42 and 44 adjacent the valves and extending into chambers 43 and 45, respectively, are fluted to allow flow of fluid under pressure to said chambers from chamber 36a upon unseating of the valves. The remainder of the valve stems are cylindrical in form and the fit therebetween and the respective bores is such as to prevent any material loss of fluid under pressure from chambers 43 and 45 when the valves are open, but to allow release of fluid under pressure from said chambers, when the valves are closed, by way of clearance space around the stems.

The chambers 43 and 45 are connected respectively to pipes 36 and 37, and it will be evident that with vale 38 open and valve 39 closed, fluid under pressure will be supplied through pipe 36 to chamber 33 to actuate the ram 31, while the ram chamber 34 will be vented by way of pipe 37 and chamber 45 and past the stem 44 of valve 39 to the atmosphere. If valve 39 is open with valve 38 closed, fluid under pressure will be supplied to chamber 34 to actuate ram 32, while chamber 33 above the ram 31 will be vented to atmosphere past the stem 42 of valve 38.

Each engine is provided with a conventional maneuvering gear which may comprise a rock shaft 47, and a power operable lever 48 and a manually operable lever 48a both of which are connected to said shaft for rocking same to control the starting, stopping, and reversing of the engine. As indicated by legends in Figs. 7, the levers 48 and 48a have a neutral or "Stop" position and at one or an "Ahead" side thereof a "Shift" position, a "Run" position, and a "Start" position, and at the opposite or an "Astern" side, oppositely arranged "Shift," "Run" and "Start" positions; the two "Shift" positions being arranged immediately adjacent the "Stop" position and the two "Start" positions most remote.

The lever 48 associated with each engine is provided with an operating member 49 disposed to rock across the ends of the valve stems 42 and 44 of the respective valve device 35. The member 49 has a raised portion 50 arranged to unseat the valve 38 in and only in "Shift" position of lever 48 at the "Ahead" side of "Stop" position, and another raised portion 51 arranged to unseat valve 39 in and only in the other "Shift" position. It will thus be seen that if lever 48 is moved in the "Ahead" direction, the valve 38 will operate to supply fluid under pressure to chamber 33 for moving the ahead ram 31 to its inner position shown in the drawing while the astern ram 32 will be free to move to its outer position, for thereby setting the cams in the engine to provide for starting of the engine in the direction to cause ahead movement of the ship. If lever 48 is, however, moved in the "Astern" direction to "Shift" position, the valve 39 will be operated to supply fluid under pressure to move the astern ram 32 to its inner position while the ram 31 will be moved to its outer position, to thereby provide for starting of the engine in the opposite direction.

Reference numeral 47a indicates a starting air valve which when open permits supply of fluid under pressure from a supply pipe 47b to a pipe 47c for effecting starting of the prime mover in a well known manner. A cam 47d mounted on shaft 47 is provided for opening valve 47a in the two "Start" positions of levers 48, 48a and to permit closing of said valve by a spring 47e in all other positions of said levers.

In use, it is desired that lever 48 of engine 1 will remain in the "Shift" position at the selected side of "Stop" position until after the respective ram 31 or 32 has moved to its inner position to properly condition the engine cams, and then the lever may be moved further to the "Start" position to cause starting of the engine in the selected direction. After the engine is thus started, the lever 48 will be moved back to the adjacent "Run" position in which it will be carried until it is later desired to stop or reverse the engine.

The lever 48 associated with engine 2 has the same control positions as that associated with engine 1, and is operable upon movement to such positions to control the starting, stopping, and reversing of said engine in the same manner as above described in connection with engine 1.

A power actuator 53 is associated with each of the engines 1 and 2 for moving the respective maneuvering gear lever 48 to its different positions. Each actuator comprises a bracket 54 secured to the respective engine, an ahead motor 55 mounted on said bracket at one side of said lever and an astern motor 56 mounted on said bracket at the opposite side of said lever.

The two motors 55 and 56 of each actuator are of identical construction, each comprising a piston 57 and a rod 58 projecting from one side of said piston through a non-pressure chamber 59 for contact with the adjacent side of lever 48. Encircling the rod 58 within each non-pressure chamber 59 is a movable stop 60 and a coil spring 61 under a chosen degree of pressure. This spring bears at one end against the stop 60 and is supported at the opposite end on a shoulder 62 in the casing. One end of stop 60 is arranged for contact with piston 57 while at the opposite end is an outturned collar 63 for contacting a shoulder 64 in the casing to limit movement of the stop by spring 61, but providing for movement of said stop and of the respective piston against said spring in the direction of lever 48. With collar 63 in contact with shoulder 64 and piston 57 in contact with stop 60, the end of piston rod 58 will just engage the lever 48 when said lever is in its "Stop" position as shown in the drawing.

Each motor 55 and 56 further comprises a movable stop 65 encircling rod 58 within spring 61. A precompressed spring 66 encircling rod 58 within stop 65 bears at one end against said stop urging same in the direction of the respective piston 57, while the opposite end of said spring is supported on an annular shoulder 67 in the casing. Each stop 65 is provided at one end with an annular collar 68 arranged to cooperate with shoulder 62 in the casing to limit movement of said stop by spring 66 but providing for movement of said stop in the direction against said spring.

With the two stops 60 and 65 in each motor in contact at one end with shoulders 64 and 62, respectively, in the casing, the opposite ends of said stops are spaced from each other a distance equal to the degree of movement of lever 48 between "Stop" position and either "Shift" position at the point of contact between said lever and either piston rod 58. In "Shift" position of lever 48 at the "Ahead" side of "Stop" position the stop 60 is arranged to contact stop 65 in the ahead motor 55, while in the other "Shift" position the corresponding stops in the astern motor 56 are arranged to engage each other.

Piston 57 in each of the two motors 55 and 56 has at its outer face a pressure chamber 70 which in motor 55 is connected to an ahead control pipe 71 while in the astern motor 56 chamber 70 is connected to an astern control pipe 73. A movable stop 75 is urged by a precompressed spring 76 into each pressure chamber 70 for engagement by the respective piston 57, said stop having an annular collar 78 arranged to engage a shelf 79 in the casing for limiting such inward movement but providing for movement in the opposite direction against the opposing action of the respective spring. With collar 78 on stop 75 in motor 56 in contact with the casing shelf 79, the opposite end of said stop is disposed for engagement with piston 57 in said motor to define "Run" position of lever 48 at the "Ahead" side of "Stop" position. Piston 57 in motor 56 is movable against the opposing action of the spring loaded stop 75 to a position in which said stop engages a surface 80 in the casing which defines the "Start" position of lever 48 at the "Ahead" side of "Stop" position. The "Run" and "Start" positions of lever 48 at the "Astern" side of "Stop" position are defined in a like manner by the corresponding parts of the ahead motor 55.

The operation of the two actuators 53 is identical, each being controlled by different pressures of fluid provided in pressure chambers 70 of the two motors 55 and 56 through the respective ahead and astern control pipes 71 and 73. The operation of the actuator 53 associated with engine 1 will now be described with particular reference to Fig. 7.

When the engine 1 is stopped, fluid at a chosen pressure, such as 20 lbs. per square inch, is provided through both the ahead and astern control pipes 71 and 73 in pressure chambers 70 to act on pistons 57 in the two motors 55 and 56, and this pressure of fluid moves said pistons into contact with the respective stops 60. The springs 61 exert pressure on stops 60 sufficiently in excess of this pressure of fluid on pistons 57 to maintain the collars 63 on said stops in contact with shoulders 64 in the casing and thus hold the pistons 57 against movement past the positions in which they are shown in the drawing. In this position of the two pistons 57 the ends of the piston rods 58 engage the opposite sides of lever 48 and hold said lever in its "Stop" position shown.

To move the lever 48 from "Stop" position to "Shift" position at the "Ahead" side of "Stop" position for conditioning the engine to operate in a direction to cause ahead movement of the ship, the astern control pipe 73 is opened to the atmosphere for relieving pressure of fluid in chamber 70 on the astern motor 56, while fluid at a chosen pressure, such as 35 lbs. per square inch, is supplied through the ahead control pipe 71 to chamber 70 in the ahead motor 55, in a manner which will be later described. In the ahead motor 55, this pressure of fluid provided in chamber 70 to act on piston 57 overcomes the opposing force of spring 61 and moves said piston and stop 60 to a position in which said stop contacts the movable stop 65 so that spring 66 then becomes effective in conjunction with spring 61 to oppose further movement of the piston, the combined force of the two springs in this position of the piston being sufficiently in excess of opposing pressure of fluid present in chamber 70 to prevent the further movement of said piston in an inwardly direction.

Movement of the piston 57 in the ahead motor 55 to the position defined by contact between the respective stops 60 and 65 moves the lever 48 from its "Stop" position to its "Shift" position at the "Ahead" side of "Stop" position. The lever 48 is thereby operated to actuate the valve device 35 to supply fluid to chamber 33 above the ahead ram 31 for effecting movement thereof to its innermost position for conditioning the cams in the engine to provide for starting same in a direction to attain ahead movement of the ship.

After lever 48 is moved to the "Shift" position at the ahead side of "Stop," the pressure of fluid in chamber 70 of the ahead motor 55 is increased to a certain higher degree, such as 100 lbs. per square inch, and this pressure acting on piston 57 in said motor moves said piston against the opposing force of both springs 61 and 66 into contact with movable stop 75 in the astern motor 56, and then moves said stop to the position in contact with surface 80 in the casing, this movement being opposed by the additional force of spring 76 in the latter motor as will be apparent. In this position of piston 57 in the ahead motor 55, the lever 48 will be in the "Start" position at the "Ahead" side of "Stop" position for causing starting of the engine in the direction for causing ahead movement of the ship.

After the engine is started, as just described, pressure of fluid in chamber 70 in the ahead motor 5 is reduced to a chosen degree, such for example as 55 lbs., and this pressure acting on piston 57 in said motor produces a force less than the combined force of springs 61 and 66 in said motor plus that of spring 76 in the astern motor 56, but exceeding the combined forces of the two first named springs, whereby the spring 76 in motor 56 moves the piston 70 therein and thereby piston 70 in the ahead motor 55 to a position in which collar 78 on stop 70 in motor 56 engages the shelf 79, and in which position the lever 48 will be in its "Run" position at the "Ahead" side of "Stop" position. The lever will then be maintained in this run position by pressure of fluid maintained in chamber 70 of the ahead motor 55 and the opposing force of spring 76 in the motor 56, and said lever will remain in this position even in the event of failure of the fluid pressure in chamber 70 of the ahead motor 55, since under such a condition, the respective piston 57 and rod 58 will merely move out contact with lever 48 under the action of the respective spring 61, as will be apparent.

To return lever 48 to "Stop" position for stopping the engine the pressure of fluid in the ahead control pipe 71 is reduced to 20 lbs. which permits springs 61 and 66 in the ahead motor 55 to act to return piston 57 of said motor back to the position shown in the drawing, while fluid at the same pressure (20 lbs.) is supplied to the astern control pipe 73 which moves piston 57 in motor 56 to the position in contact with the respective stop 60, the latter piston as it thus moves shifting the lever 48 back to the "Stop" position.

To move lever 48 to its different positions at the "Astern" side of "Stop" position, fluid at different pressures of 35 lbs., 100 lbs., and 55 lbs. are successively provided through the astern control pipe 73 in the pressure chamber 70 of the astern motor 56, and the pressure in the ahead control pipe 71 is reduced, whereby the piston 57 in motor 56 will cause positioning of lever 48 in a manner which will be apparent from the above description of operation of the ahead motor 55. Return of lever 48 from "Run" position at the "Astern" side of "Stop" position to "Stop" position may be accomplished by providing fluid at 20 lbs. pressure through the ahead control pipe 71 in chamber 70 of the ahead motor 55 upon a reduction in pressure in said chamber in motor 56 to a like pressure, as will also be apparent from the above description.

In each of the control pipes 71 and 73 is a cut-out valve device 200 located for operation by the engineer for either opening communication through the respective pipe or for closing such communication and for at the same time opening chamber 70 in the respective fluid motor 55 or 56 to the atmosphere. The purpose of these cut-out valve devices is to enable the engineer to remove either engine from control by the pilot in case of trouble, such as a broken oil line, and then after the trouble has been corrected to permit the engineer to return the engine to the pilot for control. With either engine thus removed from control by the pilot, the engineer by manual operation of lever 48a may stop the engine and restart same in either direction, as will be apparent.

The supply of fluid under pressure to pressure chambers 70 in the ahead and astern motors 55 and 56 is arranged to be controlled through two interlock valve devices 72 and 74, respectively, which are associated with the ram motor 30 of each engine, said interlock valve devices being preferably formed in what may be called a pressure head for the ram pressure chambers 33 and 34 and having passages connecting said chambers to the respective control pipes 36 and 37.

Both of the interlock valve devices 72 and 74 associated with each engine are identical in structure and as shown in Fig. 7 each has a chamber 81 containing a poppet valve 82 having a fluted stem extending through a bore connecting said chamber to a chamber 83 formed at one side of a flexible diaphragm 84. The end of the valve stem engages one side of diaphragm 84. At the opposite side of diaphragm 84 is a non-pressure chamber 85 open to the atmosphere through a port 86 and containing a spring 87 acting on the diaphragm with a predetermined degree of force tending to unseat the poppet valve 82. A bias spring 82a in chamber 81 acts on the poppet valve 82 for urging it toward its closed position. With pressure of fluid in chamber 83 acting on one side of the diaphragm 84 below a chosen degree, such as 35 lbs. per square inch, the spring 87 will hold the valve 82 open to allow flow of fluid from chamber 81 to chamber 83, but when the pressure of fluid in the later chamber is increased to a degree exceeding 35 lbs. such pressure will deflect the diaphragm against spring 87 to allow closing of valve 82 by spring 82a. Chamber 83 in the interlock valve device 72 is connected to the ahead control pipe 71 while said chamber in the interlock valve device 74 is connected to the astern control pipe 73.

Each of the two interlock valve devices further comprises a by-pass poppet valve 88 contained in the chamber 81 and having a stem 89 extending through a suitable bore in the casing and a chamber 90 in to pressure chamber 34 or 33 above the respective ram 32 or 31. The portion of the stem extending from valve 88 into chamber 90 is fluted to allow flow of fluid pressure from chamber 81 to chamber 90 and thence to diaphragm chamber 83 with said valve open, but the remainder of said stem extending into the pressure chamber above ram 32 or 31 is cylindrical in form to minimize leakage of fluid under pressure from chamber 90 to the chamber above the respective ram. With the ram 32 or 31 in its uppermost position, in which the ram 32 is shown in Fig. 7, the respective valve 88 will be unseated by engagement between said ram and the stem of said valve to thereby allow flow of fluid under pressure from chamber 81 to chamber 90, but with the ram out of this position the valve 88 will be closed by a spring 91 for closing this communication between chamber 81 and chamber 90.

Chambers 81 in the two interlock valve devices 72 and 74 associated with engine 1 are connected by ahead and astern control pipes 93 and 94, respectively, to the control stand 15, while said chambers in the interlock valve devices 72 and 74 associated with engine 2 are connected by ahead and astern control pipes 95 and 96, respectively, to said control stand.

The reference numeral 97 applied to each engine indicates a speed or fuel governor control shaft which is rockable to vary the amount of fuel supplied to the engine and thereby the speed or power output of the engine. A lever 98 is connected at one end to each shaft 97 for rocking same, said lever being shown in the drawing in a position for providing operation of the engine at an idling speed, and being rockable from this position to increase the speed or power output of the engine, the maximum speed or output being attained in a position of the lever such as indicated by a dot and dash line 99.

A fluid pressure controlled, speed regulating device 100 is provided for controlling the adjustment of lever 98 associated with engine 1, and a similar device 101 is provided for controlling the adjustment of the corresponding lever 98 associated with engine 2. Each of these devices is operatively connected to the respective governor lever 98 through means including a lever 102 and a link 103 and both are arranged for control from a common fluid pressure control pipe 104 for varying the position of the speed regulating lever 98 in accordance with the pressure of fluid in said pipe. The control device 100 also embodies means responsive to variations in pressure of fluid in a vernier control pipe 105 for effecting minor adjustments of the governor shaft 97 on engine 1 relative to that on engine 2 in order to synchronize the speed or power output of the two engines. The main speed control pipe 104 and the vernier control pipe 105 are both connected to the control stand 15. The speed regulating devices 100 and 101 are fully disclosed in the copending application hereinbefore referred to, in view of which and the fact that such construction is not pertinent to the present invention, a further showing and description thereof are not deemed essential herein.

In addition to the two manually operative coupling control valve devices 16 and 17 hereinbefore described, the control stand 15 comprises ahead and astern control valve devices 110 and 111, respectively, and a selector valve device 112, said ahead and astern control valve devices being provided for controlling operation of the ahead and astern motors 55 and 56 of the actuator 53 associated with either or both of the two engines, as selected by the position of the selector valve device 112, as will be hereinafter brought out. The control stand further embodies a speed regulating device 113 for controlling, through the medium of pipe 104, the speed or power output of the two engines; a vernier control valve device 114 for controlling through pipe 105 operation of the speed regulating device 100 to effect minor speed adjustments of engine 1 with respect to engine 2 as above described, and a valve device 115 for controlling operation of the brake relay valve device 25.

Each of the valve devices 110, 111, and 113 may be of any suitable self-lapping type, but preferably are of the type fully disclosed in the copending application hereinbefore referred to. Briefly, each of these valve devices comprises a movable plunger 116 and valve means (not shown) conditionable by displacement by said plunger from a normal position to supply fluid to a chamber 117 at a pressure proportional to the degree of such displacemnt. In the speed control device 113 the plunger 116 is shown in an uppermost position which provides for opening of the respective chamber 117 to atmosphere, and is operable upon downward movement from this position to supply fluid to said chamber at a pressure corresponding to the degree of such movement, as above mentioned. In the control devices 110 and 111, however, the plungers 116 are shown in a slightly displaced position for providing fluid in the respective chambers 117 at a pressure such as 20 lbs. for reasons which will be brought out later. Movement of the plungers 116 in the valve devices 110 and 111 in an upwardly direction will therefore provide for opening of the respective chambers 117 to atmosphere while movement in the opposite or downward direction will cause an increase in the pressure of fluid in said chambers to a degree corresponding to such movement, a maximum pressure such as 100 lbs. being obtainable in said chambers with the plungers displaced to a maximum degree by means to be later described.

The vernier speed control device 114 may be identical to the control devices 110, 111, and 113 just described, and a hand wheel 118 is provided for controlling the adjustment thereof and thereby the pressure of fluid provided in pipe 105, for reasons before described. A similar vernier control device is also shown in the copending application hereinbefore referred to and in view of this a further description thereof in the present application is not deemed essential.

Fluid under pressure for supply to chambers 117 in the respective valve devices 110, 111, 113 and 114 is provided to said devices through a common supply pipe 109 which, in use, is constantly maintained charged with fluid at constant chosen degree of pressure such as 100 lbs. by operation of a reducing valve device 119 of any suitable structure.

According to one feature of the invention, operation of the ahead and astern control valve devices 110 and 111, of the speed control device 113 and of the brake control device 115 is controlled by a single manually operable lever 120. One end of lever 120 is provided with a hand grip portion 121 for grasping by the operator, while associated with the opposite end is a cam 122 which is disposed in a cavity 123 provided in a rock shaft 124. The lever 120 and cam 122 are rigidly secured on a shaft 125 extending through the axis of rock shaft 124 at right angles thereto. This shaft 125 is supported and journaled at opposite ends in suitable bearings in the shaft 124. The rock shaft 124 is arranged with one end adjacent the control valve device 110 and the opposite end adjacent the control valve device 111 and with the two ends journaled in suitably spaced bearings 126 provided in the control stand.

Two oppositely arranged arms 130 and 131 are secured at their inner ends to the opposite ends of shaft 125, outside of the rock shaft 124, for movement with the lever 120. These arms extend in opposite directions from the shaft 125 with their outer ends bent around the respective rock shaft bearings 126 so as to move in a plane including the axis of the rock shaft 124.

The outer or free end of arm 130 engages one end of a lever 132 which is pivoted at its opposite end to a fixed part of the control stand. Intermediate the ends of lever 132 is a boss 133 which contacts plunger 116 of the astern control device 110 for controlling operation of said device. The outer or free end of lever 131 engages one end of a lever 134 which is pivoted at its opposite end to any fixed part of the control stand. Intermediate the ends of lever 134 is a boss 135 which engages plunger 116 of the ahead control valve device 111 for controlling operation of said device.

From the above description, it will be seen that rocking of lever 120 in a counterclockwise direction from a neutral position as viewed in Fig. 1 will actuate lever 132 and thereby the ahead control valve device 110 to increase pressure of fluid in the respective chamber 117 to a degree corresponding to the extent of movement of said lever, while like movement of arm 131 will permit lever 134 to move in the opposite direction and allow the astern control valve device 111 to operate to open the respective chamber 117 to atmosphere. On the other hand, movement of lever 120 from the neutral position in a clockwise direction will actuate the valve device 111 to supply fluid to the respective chamber 117 at a pressure proportional to the extent of such movement while allowing operation of the valve device 110 to open the respective chamber 117 to the atmosphere. It will thus be seen that by selective positioning of lever 121 in either direction out of its neutral position the valve devices 110 or 111 may be selectively caused to operate to provide any desired pressure of fluid in the respective chambers 117. With the lever 120 in its neutral position shown, the two arms 130 and 131 and levers 133 and 134, respectively, are so arranged as to cause operation of valve devices 110 and 111 to provide fluid at a certain chosen degree of pressure such as 20 lbs. in both of the respective chambers 117.

The lever 120 has a "Stop" or neutral position in which it is shown and is movable therefrom in a clockwise direction indicated by the legend "Ahead" to first a "Run" position and then a "Start" position as also indicated by legends. At the opposite or "Astern" side of "Stop" position, the lever has corresponding, but reversely arranged "Run" and "Start" positions. It will thus be seen that the lever 120 has the same positions as lever 48 of the two actuators 53 with the exception of the "Shift" positions at opposite sides and immediately adjacent to the "Stop" position.

The brake control device 115 comprises two oppositely seating poppet valves 137 and 138 contained in chambers 139 and 140 which are open to the fluid pressure supply pipe 109 and to atmosphere through a port 141, respectively. The two valves 137 and 138 have axially aligned fluted stems extending in the direction of each other for engagement in an intermediate chamber 142 which is open to pipe 26 leading to the brake control relay valve device 25. A spring 143 in chamber 139 acts on the valve 137 for urging same to its closed position and for at the same time opening the valve 138.

Chamber 140 also contains a plunger 144 suitably supported in the casing in axial alignment with valve 138 and with one end engaging said valve. The opposite end of plunger 144 extends outside of the casing in alignment with one end of an operating pin 145, which is suitably supported in a bore provided in a fixed portion of the control stand. The opposite end of pin 145 is slidably mounted in an axial bore provided in the adjacent end of the rock shaft 124 and which bore opens to the cavity 123 therein. The cam 122 on the inner end of the operator's lever 120 is provided with two spaced recesses 146 and 147 arranged to receive the end of pin 145 when lever 120 is in either one or the other of the two "Run" positions. With lever out of either "Run" position the end of pin 145 is arranged to contact the peripheral surface of cam 122 outside of the recesses 146 and 147. It will thus be seen that with lever 120 out of the "Run" positions the pin 145 will hold the valve 138 closed and the valve 137 open to thereby allow flow of fluid under pressure from pipe 109 to the relay valve device 25 to actuate same for effecting operation of the brake cylinder device 24 and thereby lever 23 and the brake shoes 22 to brake the propeller shaft 7. With the control lever 120 in either "Run" position, however, the pin 145 is free to move to the right into either one or the other of the recesses 146 and 147 in response to the pressure of spring 143 acting to seat the valve 137 and open the valve 138. Under this condition the pipe 26 leading to the relay valve device 25 is vented to atmosphere past valve 138 and through port 141 to thereby cause operation of the relay valve device 25 and thus of the brake cylinder device 24 to effect a release of the brake on the propeller shaft 7.

The rock shaft 124 is provided below the cam carrying shaft 125 with a depending cam 149 the peripheral surface of which is in contact with plunger 116 of the speed control device 113. With the lever 120 in the position shown in Figs. 1, 2, and 3, the cam 129 allows maximum upward movement of plunger 116 to thereby provide for operation of the speed valve device 113 to open chamber 117 and thereby the speed control pipe 104 to the atmosphere for effecting operation of the speed regulating devices 100 and 101 to reduce the speed of the two engines to idling. Movement of lever 120 from this position in a clockwise direction as viewed in Fig. 3 or in the direction toward the top of the drawing as viewed in Fig. 2, will operate the cam 149 to displace the plunger 116 of the valve device 113 in a downwardly direction a distance proportional to the extent of such movement. It will thus be seen that on moving the lever 120 from the position shown in the drawing in the direction just described fluid under pressure will be supplied to both speed regulating devices 100 and 101 for increasing the speed of the two engines in accordance with the extent of such movement, while return of the lever to the position shown in the drawing will effect a reduction in the pressure of fluid supplied to said devices to thereby reduce the speed of the engines. On proper adjustment of the lever 120 any desired speed of the engines above idling can therefore be obtained.

It will be noted that fluid under pressure will always be supplied to both speed regulating devices 100 and 101 upon operation of lever 120, so that even if one engine is stopped, the respective speed regulating device will operate in the same manner as if the engine were running. This however is immaterial since with an engine stopped the fuel supply to the engine is cut off as is well known.

A cover 150 is secured to the control stand 15 and has a relatively long slot 151 extending parallel to the axis of rock shaft 124 for guiding lever 120 in its movement between "Stop" position and the "Start" positions at the opposite sides thereof. This slot is so disposed as to hold the lever in a position in which the speed control device 113 is adjusted to open the speed control pipe 104 to the atmosphere. The cover also has two parallel slots 152 and 153 arranged at right angles to the slot 151, the slot 152 opening to the slot 151 in the "Run" position of lever 120 at the "Astern" side of "Stop" position, while the slot 153 opens to slot 151 in the other "Run" position. It will thus be seen that with the lever 120 in "Stop" position and in both "Start" positions the speed regulating device 113 will be adjusted to cause operation of the engines at idling speed, and the engines can be accelerated only after the lever is moved out of either "Start" position back to the adjacent "Run" position, at which time it will be moved out of the slot 151 and into one or the other of the slots 152 or 153. Movement of lever 120 to the extreme end of either of the slots 152 and 153 provides for operation of the speed control device 113 to obtain maximum speed or power output of the engine.

The selector valve device 112 comprises a casing containing a rotary valve 155 which has three different operating positions as illustrated in Figs. 1, 5, and 6, respectively. A handle 156 is connected to the rotary valve 155 for turning same to any selected one of its different positions.

The forward and the astern control pipes 93 and 94 for the actuator 53 associated with engine 1 are connected to the seat of the rotary valve 155, as is the forward and astern control pipes 95 and 96 of the actuator 53 associated with engine 2. Chambers 117 in the ahead and astern control valve devices 110 and 111 are connected respectively by passages 157 and 158 to the seat of the rotary valve 155. A passage 159 is also connected to the seat of the rotary valve 155 and is supplied with fluid at a pressure such as twenty pounds by any suitable regulating device 160 which may be supplied with fluid under pressure from any suitable source such as pipe 109 which may be charged with fluid at a higher pressure, such as 100 pounds.

In Fig. 1 the selector rotary valve 155 is shown in a position providing for starting only of engine 1 while retaining engine 2 stopped. In this position of the rotary valve a cavity 161 therein connects: the fluid pressure supply pipe 159 to both the forward and astern control pipes 95 and 96 leading to the actuator 53 associated with engine 2 whereby the reduced pressure of twenty pounds supplied by the regulating valve device 160 will flow to piston chambers 70 in the ahead and astern motors 55 and 56 of said actuator to thereby maintain the pistons 67 in said motors in the positions shown in Fig. 7 for holding the respective maneuvering gear lever 48 in its "Stop" position. However, the ahead and astern control pipees 93 and 94 from the actuator 53 associated with the engine 1 are connected through cavities 162 and 163 in the rotary valve 155 to pipes 156 and 157 leading to chamber 117 of the astern and ahead control valve devices 111 and 110, respectively. With the operator's control lever 120 in its "Stop" position, causing operation of the valve devices 110 and 111 to supply fluid to the respective chambers 117 at a certain chosen pressure such as twenty pounds, such pressure will be effective through the interlock valve devices 72 and 74 in chambers 70 of the ahead and the astern motors 55 and 56 of the actuator 53 associated with engine 1 to thereby maintain the pistons 67 in said motors and the respective maneuvering gear lever 48 in its "Stop" position in which engine 1 will also be stopped.

It will be noted that the pressure of fluid supplied to the ahead and astern control pipes 95 and 96, and 93 and 94, as just mentioned, is effective through the interlock valve devices 72 and 74 in the respective actuators 53 of engines 2 and 1, since such pressure is insufficient to deflect the diaphragms 84 in the interlock valve devices against the springs 87, so that the valves 82 in said devices will be open.

It will now be seen that with the selector valve device 112 in the position shown in Fig. 1, the engine 1 is arranged for control by lever 120 while the engine 2 is cut out of control and will remain stopped.

If the operator now desires to start engine 1 in a direction to cause movement of the ship forwardly, he rocks the lever 120 out of "Stop" position in the direction indicated by the legend "Ahead" to "Start" position for thereby effecting operation of the ahead control valve device 111 to supply fluid at a maximum degree of pressure to chamber 117 in said device while allowing the astern control valve device 110 to open its chamber 117 to atmosphere. Chamber 70 in the astern motor 56 of the actuator 53 associated with engine 1 will thus be opened to the atmosphere, while at the same time fluid at the 100 pounds pressure supplied by the control valve device 111 will flow through the ahead control pipe 93 to the interlock valve device 72. Fluid thus supplied to the interlock valve device 72 associated with engine 1 will then flow past the respective open valve 82 to chamber 83 and thence to piston chamber 70 in the ahead motor 55 of the respective actuator until the pressure obtained in said chambers is increased to the degree (thirty-five pounds) which overcomes the opposing force of spring 87 on the respective diaphragm 84 whereupon said diaphragm will be deflected against the opposing force of said spring to allow seating of the valve 82 so as to prevent further flow of fluid under pressure to the actuator 53.

This limited pressure of fluid obtained in chamber 70 in the ahead motor 55 of the actuator associated with engine 1 operates the respective piston 67 as before described to move the maneuvering gear lever 48 in the "Ahead" direction from "Stop" position to "Shift" position to thereby operate the valve device 35 to supply fluid under pressure to chamber 33 to move the ahead ram 31 to its lower position shown in Fig. 7 and at the same time to move the reverse ram 32 to its upper position also shown in Fig. 7. As the reverse ram 32 is thus moved into its upper position, indicating that the cams in the engine have been properly set for starting of the engine to propel the ship forwardly, said ram unseats the valve 89, thereby opening a by-pass around the control valve 82 which allows the fluid at 100 pounds pressure provided in the ahead control pipe 93 with the operator's control lever 120 in "Start" position at the "Ahead" side of "Stop" to become effective in piston chamber 70 of the ahead motor 55 of the actuator associated with engine 1. The actuator will then operate to move the maneuvering gear lever 48 to its "Start" position to effect starting of the engine, as above described.

After the engine is thus started the operator moves the control lever 120 from the "Ahead" "Start" position to the "Ahead" "Run" position, thereby reducing the pressure of fluid supplied to the ahead control pipe 93 to the chosen lower degree such as fifty-five pounds. The corresponding reduction in pressure of fluid in chamber 70 of the ahead motor 55 of the actuator associated with engine 1 then allows the pressure of spring 76 acting on piston 67 in the astern motor to return the pistons of the two motors and thereby the maneuvering gear lever 48 from its "Ahead" "Start" position to its "Ahead" "Run" position, in which it will then remain as long as it is desired to operate the engine in this direction.

It will be noted that after the engine 1 is started the return of lever 120 to its "Run" position for causing return of the maneuvering gear lever 48 to its run position aligns said lever for movement into the slot 153, so that said lever may be then moved out of the slot 151 into the slot 153 to obtain any desired speed or power output of engine 1, with the engine 2 stopped.

If it is desired to stop the engine 1 the operator returns the lever 120 from slot 153 into the slot 151 for reducing the speed of the egine to idling and then moves said lever back to "Stop" position, for thereby actuating the valve device 111 to reduce the pressure of fluid supplied to the ahead motor 55 in the actuator associated with engine 1 to the chosen low degree of twenty pounds, while at the same time actuating the control valve device 110 to supply fluid at a corresponding pressure to the astern motor 56 of said actuator. The actuator 53 will then operate to return the maneuvering gear lever 48 to its "Stop" position for stopping the engine.

If the operator desires to start engine 1 in the reverse direction for causing astern movement of the ship he moves lever 120 from "Stop" position in the "Astern" direction to "Start" position to thereby effect operation of the valve device 110 to supply fluid at maximum pressure to the astern control pipe 94 while allowing operation of the ahead control valve device 111 to open the ahead fluid control pipe 93 and thereby chamber 70 of the respective ahead motor 55 to atmosphere. Under the control of the interlock valve device 74 associated with engine 1 the actuator 53 then operates to first cause shifting of the cams in the engine to provide for reverse operation of the engine and then starting of the engine. After the engine is started, the operator returns lever 120 to the "Astern" "Run" position and the actuator associated with engine 1 will then return the lever 48 to its "Astern" "Run" position as will be apparent from the above description.

After the engine 1 is thus started in the reverse direction and the lever 120 is moved back to its "Astern" "Run" position said lever will be aligned with slot 152, so that rocking of said lever into said slot may cause operation of said engine at any desired speed or power output.

In order to stop the engine operating in the reverse direction just described the operator need only return lever 120 out of slot 152 into slot 151 to provide for reducing the speed of the engine to idling and then move said lever back to "Stop" position in which the engine will be stopped.

If the operator now desires to use engine 2 while engine 1 is stopped, he turns the rotary valve 155 from the position shown in Fig. 1 to the position shown in Fig. 5, in which latter position a cavity 164 in the rotary valve connects passage 159 supplied with fluid under pressure from the regulating valve device 160 to the ahead and astern control pipes 93 and 94 leading to actuator 53 associated with engine 1, whereby said actuator will maintain the respective maneuvering gear lever 48 in its neutral position and the engine 1 therefore stopped. Also in the position of rotary valve 155 shown in Fig. 5 cavities 165 and 166 therein connect the ahead and astern control pipes 95 and 96 of engine 2 to the ahead and astern control valve devices 111 and 110, whereby the actuator 53 associated with engine 2 will operate in response to operation of the control lever 120 to stop the engine 2 or to selectively cause starting and running of said engine in either one direction or in the reverse direction, as desired, and to vary the speed of said engine, in a manner which will be readily apparent from the description of the control of engine 1.

To stop engine 2 when desired, regardless of the direction of its operation, the operator need only return the lever 120 to its "Stop" position.

Now let it be assumed that the operator desires to employ both engines 1 and 2 to propel the ship. To accomplish this he turns rotary valve 155 of the selector valve device to the position shown in Fig. 6. In this position of the rotary valve a cavity 167 therein connects both ahead control pipes 93 and 95 to passage 156 leading to the ahead control valve device 111, while another cavity 168 therein connects both astern control pipes 94 and 96 to passage 157 leading to the astern control valve device 110. With the actuators 53 of both engines 1 and 2 thus connected to the ahead and astern control valve devices 111 and 110 respectively, each engine will operate in the same manner as above described in response to operation of lever 120, but the operation of both engines will be in unison. It will thus be seen that both engines can be started together in either direction or stopped together, and it will also be apparent, that after both engines are started the speed or power output of both engines may be varied in unison by desired positioning of lever 120 in either slot 152 or slot 153.

When either engine 1 or 2 is stopped and the other engine is operating to drive the ship the hydraulic coupling 3 or 4 for the stopped engine will be drained as before described for disconnecting the engine from the propeller shaft 7.

Assuming that engine 1 is driving the ship and that the operator desires to start engine 2 and connect same to the propeller shaft 7 to drive with engine 1, the operator moves the selector valve device 112 to the position shown in Fig. 6 and with the lever 120 already in "Run" position, the actuator 53 associated with engine 2 will operate to condition the cams in said engine for causing same to operate in the same direction as engine 1 and then the parts of said actuator will move to their "Run" position corresponding to the position of lever 120. Lever 18 of the coupling control valve device 15 may then be moved to its fill position to cause operation of the coupling 4 to connect engine 2 to the common drive shaft 5, whereby the engine 2 will be started by engine 1 or by the ship's propeller and said engine will then accelerate up to the speed of engine 1 and work in unison therewith.

Another method of starting engine 2 with engine 1 operating is for the engineer to operate the respective maneuvering gear actuator lever 48 to "Start" position by the manually operative lever 48a to start the engine after the selector valve device has been moved to the multiple control position shown in Fig. 6. After the engine is thus started lever 48a is released and lever 48 returns to "Run" position as determined by the position of lever 120. The coupling 4 may then be operated to connect engine 2 to the propeller.

In a manner which will be evident from the above description either engine 1 or 2 if stopped with the other operating may be started in the same direction as the operating engine and connected in with the operating engine to drive the propeller.

In case both engines are operating and the operator desires to stop either one while allowing the other to continue to run, he may turn the rotary valve 155 of the selector valve device to the position shown in Fig. 1 for stopping engine 2 or to that shown in Fig. 5 for stopping engine 1. With the selector valve thus conditioned the actuator 53 of the engine selected to be stopped will move the respective lever 48 to "Stop" position in which the engine will stop. At the same time the operator will also dump the respective coupling 3 or 4 to disconnect the engine which he is stopping from the propeller shaft 7, so as not to interfere with continued operation of the engine which he has selected to keep running.

It will be noted that the brake on the propeller shaft brake drum 21 is released with lever 120 in either "Run" position in which the ship is being driven by either or both engines; but is applied in all other positions of said lever. Two reasons for the brake is to provide rapid deceleration of the engine or engines at a time when it is desired to reverse same, and to then hold the propeller stopped while starting the engine in reverse.

Summary

From the above description it will now be seen that we have provided a system providing for selective control of the starting, stopping and reversing of a plurality of Diesel engines, embodying a single control lever for these operations as well as for controlling the speed of the engines either individually or in multiple and for controlling a brake for the engine or engines. Operation or movement of the single lever provides for starting of the engine or engines in either direction only when conditioned to provide for operation of the engines at a chosen low speed, such as idling, and prevents operation to accelerate the engine or engines until after being started.

The engines with which the system is associated are of the type in which the maneuvering gear shaft must not be moved past either shift position to the selected start position until after the cams in the engines have been properly conditioned for starting in the selected direction, and interlock devices are associated with the engine cam shifting rams to automatically accomplish this end. These interlock devices preclude the need for any attention on the part of the operator with respect to the shifting of the cams, so that the operator may move this control lever directly to the desired starting position.

Only one control lever is provided for controlling the starting, stopping and reversing of both engines as above mentioned, but associated therewith is a selector valve device which is adjustable by the operator to render either engine responsive and the other non-responsive to operation of said lever, or to render both engines responsive as desired, thus providing a relatively simple yet efficient control of the engines either individually or in multiple.

Having now described the invention what we claim as new and desire to secure by Letters Patent, is:

1. An apparatus for controlling operation of a control means for a reversible prime mover which control means is selectively operable to condition said prime mover for operation in either one direction or in the reverse direction and for also controlling the positioning of a control member for said prime mover which control member has a first position, a prime mover starting position, and a third position intermediate said first and starting position for effecting operation of said control means, said apparatus comprising in combination, mechanism operable to move said member from said first position to said starting position, an operator's control device operable upon movement to a start position to effect operation of said mechanism to move said member from its first position to its starting position, stop means operable to limit movement of said member to its intermediate position upon movement of said operator's control device to its start position, and means controlled by said control means operable to render said stop means effective during operation of said control means and ineffective upon conditioning of said prime mover for operation.

2. An apparatus for controlling operation of a control means for a reversible prime mover which control means is selectively operable to condition said prime mover for operation in either one direction or in the reverse direction and for also controlling the positioning of a control member for said prime mover which control member has a first position, a prime mover starting position, and a third position intermediate said first and starting position for effecting operation of said control means, said apparatus comprising in combination, a fluid motor operable by fluid under pressure to move said member from said first position to said starting position, an operator's control valve device comprising a lever having a start position and operable upon movement to its start position to supply fluid under pressure to actuate said motor to move said member to its starting position, stop means operable to prevent operation of said motor to move said member from said intermediate position to its starting position upon movement of said lever to its start position, and means controlled by said control means and operable to render said stop means effective during operation of said control means and ineffective upon termination of said operation of said control means.

3. An apparatus for controlling the operation of a control means for a reversible prime mover which means is selectively operable to condition said prime mover for operation in either one direction or in the reverse direction and for also controlling the positioning of a control member for said prime mover which control member is movable to a starting position, said apparatus comprising in combination, a fluid motor operable to control operation of said control means and movement of said control member, stop means cooperable with said motor when the pressure in said motor is of a certain degree to permit operation of said motor to effect operation of said control means but to prevent operation of said motor to effect movement of said control member to said starting position, said motor being operable when subject to fluid at a chosen pressure in excess of said certain pressure to render said stop means ineffective and move said control member to said starting position, an operator's control device comprising a lever movable to a start position to effect operation of said device to provide fluid at said chosen pressure for supply to said motor, pressure limiting means operable automatically to limit to said certain degree the pressure of fluid provided in said motor by said operator's control device with said lever in its start position, and means controlled by said control means operable upon termination of said operation of said control means to render said pressure limiting means ineffective.

4. An apparatus for controlling the operation of a control means for a reversible prime mover which means is selectively operable to condition said prime mover for operation in either one direction or in the reverse direction and for also controlling the positioning of a control member for said prime mover which control member is movable to a starting position, said apparatus comprising in combination, a fluid motor operable to control operation of said control means and movement of said control member, stop means cooperable with said motor when the pressure in said motor is of a certain degree to permit operation of said motor to effect operation of said control means but to prevent operation of said motor to effect movement of said control member to said starting position, said motor being operable when subject to fluid at a chosen pressure in excess of said certain pressure to render said stop means ineffective and move said control member to said starting position, an operator's control device comprising a lever movable to a start position to effect operation of said device to provide fluid at said chosen pressure for supply to said motor, pressure limiting means operable automatically to limit to said certain degree the pressure of fluid provided in said motor by said operator's control device with said lever in its start position, and a valve operable by said control means upon termination of said operation of said control means to open a by-pass around said pressure limiting means to render said chosen pressure of fluid provided by said operator's control device effective in said motor.

5. An apparatus for controlling the operation of a control means for a reversible prime mover which means is selectively operable to condition said prime mover for operation in either one direction or in the reverse direction and for also controlling the positioning of a control member for said prime mover which control member is movable to a starting position, said apparatus comprising in combination, a fluid motor operable to control operation of said control means and movement of said control member, stop means cooperable with said motor when the pressure in said motor is of a certain degree to permit operation of said motor to effect operation of said control means but to prevent operation of said motor to effect movement of said control member to said starting position, said motor being operable when subject to fluid at a chosen pressure in excess of said certain pressure to render said stop means ineffective and move said control member to said starting position, means operable to provide said certain pressure of fluid in said motor, and other means operable by said control means upon conditioning of said prime mover for operation to increase the pressure in said motor to said chosen degree.

6. An apparatus for controlling the operation of a control means for a reversible prime mover, which means is selectively operable to condition said prime mover for operation in either one direction or in the reverse direction and for also controlling the positioning of a control member for said prime mover which member has a stop position, a start position and a third position intermediate said stop and start positions for effecting operation of said control means, said apparatus comprising a fluid pressure motor operable by fluid under presure to move said member in the direction from said stop position to said start position, said motor comprising means requiring a certain pressure of fluid to move said member to said intermediate position, a chosen greater pressure of fluid to move said member to said start position and said means being operable upon a reduction in pressure of fluid in said motor to a degree to below said certain pressure to move said member to said stop position, an operator's control device selectively operable to provide fluid in said motor at said certain pressure or at said degree below said certain pressure, said operator's control device being also operable to provide fluid at said chosen greater pressure, and means controlled by said control means operable to prevent said chosen greater pressure being effective in said motor during operation of said control means, and to permit said chosen greater pressure becoming effective in said motor upon conditioning of said prime mover for operation.

7. An apparatus for controlling the operation of a control means for a reversible prime mover, which means is selectively operable to condition said prime mover for operation in either one direction or in the reverse direction and for also controlling the positioning of a control member for said prime mover which member has a stop position, a start position and a third position intermediate said stop and start positions for effecting operation of said control means, said apparatus comprising a fluid pressure motor operable by fluid under pressure to move said member in the direction from said stop position to said start position, said motor comprising means requiring a certain pressure of fluid to move said member to said intermediate position, a chosen greater pressure of fluid to move said member to said start position and said means being operable upon a reduction in pressure of fluid in said motor to a degree to below said certain pressure to move said member to said stop position, an operator's control device comprising a lever having positions corresponding to those of said member and operable with said lever in its intermediate position to supply fluid at said certain pressure, in its stop position to supply fluid at said degree of pressure below said certain pressure, and in its start position to supply fluid at said chosen greater pressure, pressure limiting valve means interposed in a fluid control communication between said operator's control device and motor and controlled by pressure of fluid in said motor and operable automatically to close said communication upon an increase in pressure in said motor to said certain pressure, and valve means arranged to open a by-pass around said pressure limiting means to permit said chosen greater pressure to become effective in said motor, said control means being operable upon conditioning of said prime mover to operate to effect operation of said valve means.

8. An apparatus for controlling the operation of a control means for a reversible prime mover, which control means is selectively operable to condition said prime mover for operation in either one direction or in the reverse direction, and for also controlling the positioning of a control member for said prime mover which member has stop, shift, run and start positions arranged in the order named, said apparatus comprising in combination, a motor operable by fluid under pressure to move said member to its different positions, means cooperative with fluid at a certain pressure in said motor to prevent operation of said motor to move said member past said shift position in the direction of said run position, means cooperative with fluid at a chosen greater pressure in said motor to prevent operation of said motor to move said member past said run position in the direction of said start position, the last named means being ineffective to prevent operation of said motor to move said member to said start position upon an increase in pressure of fluid in said motor to a maximum degree which is in excess of said chosen greater pressure, a control device selectively operable to supply fluid at any one of the different pressures above mentioned and to also reduce the pressure of fluid supplied, valve means controlling a communication between said control device and motor and controlled by pressure of fluid in said motor and operable to open said communication when the pressure of fluid in said motor is less than said certain pressure and to close said communication when the pressure of fluid in said motor equals or exceeds said certain pressure, means operable by said member in its shift position to effect operation of said control means, and a valve closing a communication around said valve means during operation of said control means and operable by said control means to open the last named communication upon termination of operation of said control means.

9. An apparatus for controlling the operation of a reversing means for a reversible prime mover which means is selectively operable to condition said prime mover for operation in either one direction or in the reverse direction and for also controlling the positioning of a prime mover control member having stop, run and start positions arranged in the order named for controlling operation of the prime mover and having a shift position between said stop and run positions for effecting operation of said reversing means, said apparatus comprising in combination, a fluid motor operable by fluid under pressure to move said member from said stop position to said start position, means in said motor operable to prevent operation of said motor to move said member past said shift position when the pressure in said motor is less than a certain degree, means in said motor operable to prevent operation of said motor to move said member past said run position when the pressure of fluid in said motor is less than a chosen degree in excess of said certain degree, and the 1st named means being ineffective to prevent operation of said motor to move said member to said start position when the pressure in said motor is of a maximum degree which is in excess of said chosen degree, means operable to effect operation of said motor to move said member to said stop position upon a reduction in pressure of fluid in said motor to a degree below said certain degree, a first valve means and a second valve means controlling separate fluid communications to said motor, means controlled by pressure of fluid in said motor and operable thereby to effect operation of said first valve means to open the communication controlled thereby when the pressure of fluid in the motor is less than said certain pressure and to close the respective communication when the pressure of fluid in said motor equals or exceeds said certain pressure, said reversing means being operable to actuate said second valve means to open the respective communication upon conditioning of the prime mover for operation, means operable to actuate said second valve means to close the respective communication during operation of said reversing means, and means operable to supply fluid under pressure to and release fluid under pressure from said first and second valve means.

ELLIS E. HEWITT.
ARTHUR G. LARSON.

REFERENCES CITED

The following references are of record in the file of this patent:

UNITED STATES PATENTS

| Number | Name | Date |
|---|---|---|
| 1,323,686 | Forster | Dec. 2, 1919 |
| 1,682,358 | Sperry | Aug. 28, 1928 |
| 2,003,351 | Eells | June 4, 1935 |
| 2,269,548 | Olsson et al. | Jan. 13, 1942 |
| 2,288,173 | Wohanka | June 30, 1942 |
| 2,289,654 | Keel et al. | July 14, 1942 |
| 2,304,472 | Olsson | Dec. 8, 1942 |
| 2,346,820 | Casler | Apr. 18, 1944 |